United States Patent Office 3,451,712
Patented June 24, 1969

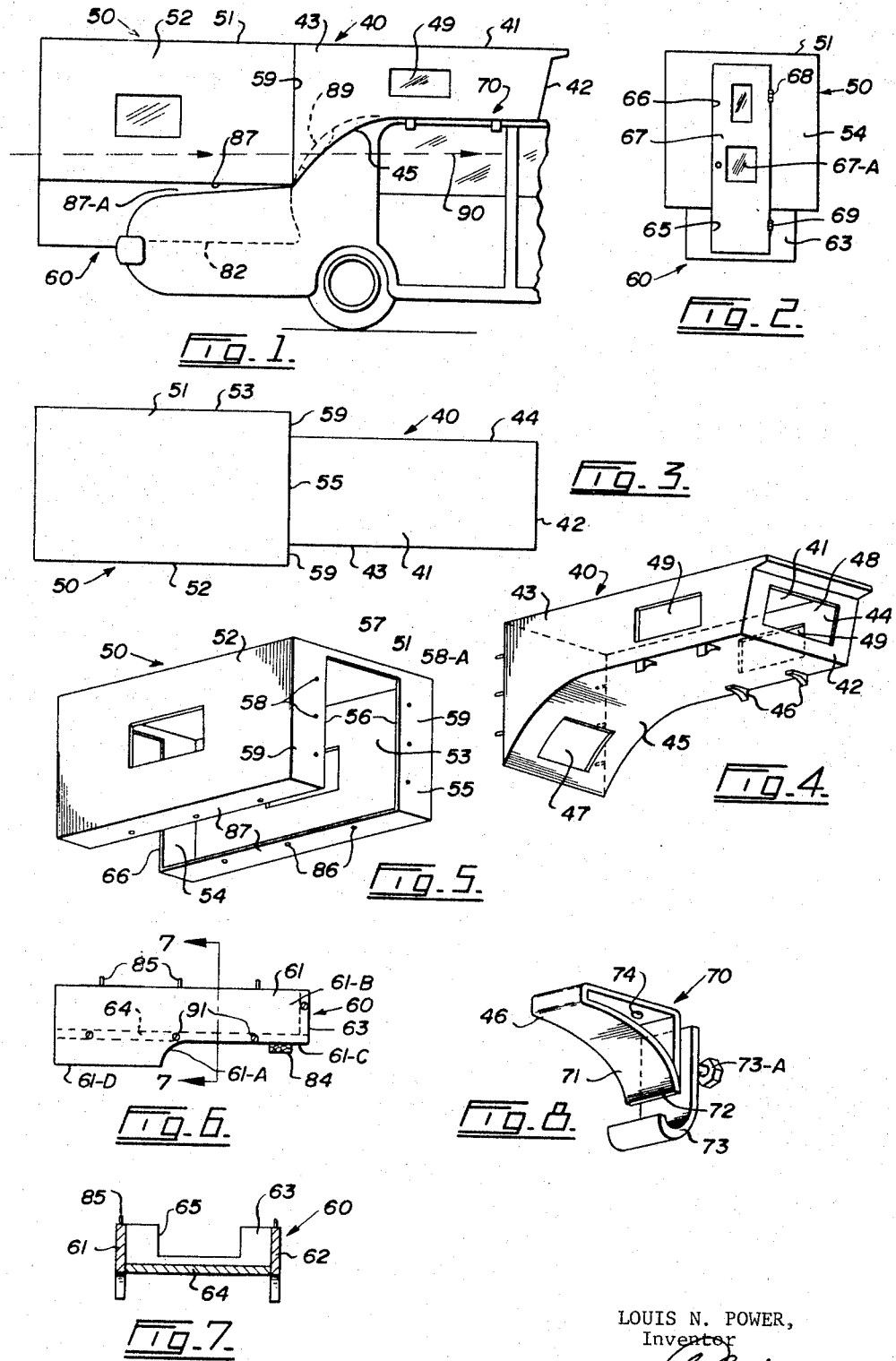

3,451,712
AUTOMOBILE TRAVELLING ACCOMMODATION
Louis N. Power, R.R. 2, Salmon Arm,
British Columbia, Canada
Filed Apr. 4, 1967, Ser. No. 628,423
Int. Cl. B60p 3/32; E04b 7/16
U.S. Cl. 296—23     7 Claims

ABSTRACT OF THE DISCLOSURE

Unitized automobile travelling accommodation structure, or "camper," to be secured to an ordinary automobile. A body unit attachable to an automobile roof, a base unit supported in the car luggage compartment after removal of the lid, and an extension unit supported by the base unit and adjustably securable to the body unit so that the assembled structure is adaptable to a range of different models.

Background of the invention

My invention relates to unitized automobile travelling accommodation having three units adapted to be assembled to an ordinary automobile.

Accommodation of this kind, sometimes referred to as a "camper," is well-known. For the most part such devices are of the nature of custom built articles adapted to a particular car, whether it be a sedan or a light delivery truck. While such custom built units have excellent features, they have a high first cost, and generally they cannot be readily removed from one vehicle and installed on another vehicle except of the same model. Furthermore, if this is done either the camper has to be, at least to a considerable extent, dismantled, or alternatively heavy equipment is required to remove it and to reinstall it.

Summary of the invention

I reduce these difficulties by providing a unitized construction having a body unit attachable to an automobile roof, a base unit supported in the car luggage compartment after removal of the lid, and an extension unit supported by the base unit and adjustably securable to the body unit. Thus one set of my units can be fitted, not of course to all automobiles, but to many automobiles of the same general size.

A further difficulty found with some prior art campers is difficulty of rear vision particularly of objects immediately behind the vehicle. I reduce this difficulty by providing a rear window and a front window of the assembled structure, the front window being in register with the car rear window so that rear vision is effected through a conventional interior rear vision mirror.

I have found that in securing a forward end of a structure of this kind to an automobile, some degree of longitudinal freedom is desirable. Accordingly, I have devised a slidable front mount structure which I prefer to rigid attachment particularly on rough roads.

Means of positively securing, for instance the base unit to the vehicle, and other means mutually securing the units, are deemed to be obvious to those skilled in the art, and therefore are herein described only in general terms.

It is contemplated that the units are of plywood construction, but other materials may be used.

Description of the drawings

By way of example there follows a detail description, related to drawings, of structure according to the invention, which however is not thereto limited. In the drawings:

FIGURE 1 is a side elevation showing a body unit, an extension unit and a base unit according to the invention, secured to one another and to a passenger automobile, FIGURE 2 is an end elevation of FIGURE 1 the automobile not being shown, FIGURE 3 is a plan view of FIGURE 1 the automobile not being shown, FIGURE 4 is a perspective view of the body unit, FIGURE 5 is a perspective view of the extension unit, FIGURE 6 is a side elevation of the base unit, FIGURE 7 is a section on line 7—7 of FIGURE 6, and FIGURE 8 is a detail perspective showing a front roof attachment bracket.

Description of preferred embodiment

Referring to FIGURE 4, the body unit generally indicated by the numeral 40 has a top wall 41, a front end wall 42, side walls 43 and 44, a curved bottom wall 45 to an outer surface of which are secured front roof attachment brackets 46. The curved bottom wall has an opening 47 for a window, being constructed and arranged so that, when the body unit is assembled in the position shown in FIGURE 1, the window 47 is substantially in register with a rear window of the automobile. Front and side windows 48 and 49 are provided. An end of the body unit remote from the front end wall 42 is open.

In FIGURE 5, the extension unit is indicated generally by the numeral 50. This unit has a top wall 51, side walls 52 and 53, a back wall 54, and a front wall 55. The front wall 55 has an opening defined by side edges 56 and a top edge 57. The front wall 55 has, adjacent the edges of the side openings, a series of uniformly spaced holes 58 to receive dowels 58-A, FIGURE 4, secured in edges of the body unit side walls 43, 44. The front wall 55, FIGURE 5, is wider than the body unit 40, the opening defined by the side edges 56 being of substantially the width of the open end of the body unit 40. The height of the opening defined by the length of the side edges 56 is however, for reasons which are later explained, less than the height of the open end of the body unit 40.

Referring now to FIGURES 6 and 7 the base unit, indicated generally by the numeral 60, has sidewalls 61 and 62, which are spaced apart by a distance somewhat less than the width of a smallest luggage compartment for use with which the accommodation structure is adapted, so that the base unit may be inserted into the said compartment. The spaced side walls each have curved side edges such as indicated at 61-A, FIGURE 6, defining, in part, outwardly extending portions 61-B having bottom edges 61-C. A bottom edge portion 61-D extending from the edge 61-A aforesaid to an end wall 63, can be adapted to rest upon an upper part of the rear bumper of the automobile, and can be further secured thereto by obvious means not shown. I usually prefer the edge 61-D to be adapted to be clear of the bumper since, in many cars, the bumper mount is not constructed to be rigid under vertical loading. As well, when the edge 61-D is adequately clear of the bumper, bumper jack means can be used.

The base unit has a bottom wall 64, and the end wall 63 has an opening 65 such that, when the base unit and the extension unit are secured to one another in the position shown in FIGURE 1, the opening 65 is aligned with an opening 66 (FIGURE 5) in the back wall 54 of the extension unit 50, the two openings defining a door opening. Referring now to FIGURE 2, a door 67 is secured in the said opening and hinged as seen at 68 and 69. The said door is provided with a window 67-A in a position later to be described.

In FIGURE 8 the numeral 70 indicates an assembly of the front roof bracket 46 of the bottom wall 45 (FIGURE 4) to supporting structure. The front bracket 46 has a lower portion 71, shaped to fit the roof of the automobile, the said lower portion also having a lower extremity 72 adapted to cooperate with an upwardly concave supporting bracket 73. The supporting bracket has clamp means 73-A adapted to secure it to a gutter, not shown, of the automobile roof. An upper portion of the roof bracket 46 has bolt holes 74 for attachment of the bracket to the body unit bottom wall aforesaid. While other means of attachment of the body unit to the roof can be employed, for instance means such as used to secure ski racks and the like to automobile roofs, it is to be noted that the bracket illustrated is not rigidly secured against longitudinal motion of translation. I have found this to be of advantage on rough roads.

Referring now to FIGURE 1, to assemble the accommodation structure to an automobile, the trunk lid is first removed and the base unit 60 inserted into the trunk with the portions 61-B and 61-A generally against and/ or supported by, or obviously secured to, fender walls of the luggage compartment. The numeral 82 indicates the floor of the luggage compartment, the bottom wall 64 can be supported by the luggage compartment floor if necessary packing pieces, such as indicated by the numeral 84 in FIGURE 6 only, being used.

It will be understood that the particular shape of the portions 61-A, B, C, D (FIGURE 6) will depend upon the shape of the particular luggage compartment.

Dowels 85 (FIGURE 6) are provided in upper edges of the base unit spaced side walls 61 and 62, and the extension unit is attached to the base unit by engaging the dowels 85 with corresponding holes 86, FIGURE 5, of the extension unit.

Assembly of the body unit 40, the extension unit 50, and the base unit 60, to the FIGURE 1 position will require little explanation to those skilled in the art. The lid of the luggage compartment having been moved, the base unit 40 being narrower than the opening to the luggage compartment, can readily be inserted with the side edges of the walls 61 supported on the luggage compartment floor as explained. Dowels 85 of the base unit are provided, and when inserted in corresponding openings 86 of the extension unit, the two units are in register. The base unit spaced side walls 61 and 62 are of such height that, when the base unit is in position and secured as above, and the extension unit thereto attached, bottom edges 87 of the extension unit are supported just clear of the rear deck of the automobile as seen in FIGURE 1, indicated by the numeral 87-A.

Referring now ot FIGURES 3 and 5, the extension unit 50 is wider than the base unit, and wider than the body unit 40. Panel like side members 59 have side edges defined by the side opening edges 56 extending to the side walls 52 and 53. As well, similar panel like members as seen at 87, FIGURE 5, and have openings 86 aforesaid to receive the dowels 85 of the base unit. The body unit 40 is positioned by dowel means as explained, and when secured by means of brackets 46 erection is complete. The units being positioned relatively to one another, they can be removably secured by obvious screw means, not shown, so as readily to be disassembled.

Mention has been made of the window 47, this is in a portion of the bottom wall 45 adjacent to, see now FIGURE 1, the rear window 89 of the automobile. A broken arrow 90 indicates a path which a ray of light from an object at the back of the automobile would take through the rear window to a rear vision mirror, not shown, to reach the eye of a driver, not shown. Referring now to the window 67-A, as seen in FIGURE 2, this is positioned so that the ray 90 passes through it, as well as through the window 47, FIGURE 4, so that the driver can see behind him. While the vision so obtained is limited, it is of value particularly when used to supplement wing mirrors.

A single model of my accommodation structure will not fit all cars, but because of the adjustment feature of the extension unit one model is adaptable to a range of sizes and shapes. Thus with two or three size ranges I am able to adapt to most cars in common use. Particularly useful in such adaptation is the provision of the spaced openings 56, FIGURE 5, so that dowels 58-A, FIGURE 4, can be selectively engaged therewith so that the bottom wall 45 of the body unit may be supported in a suitable position, and clearance between the extension unit and the deck provided. It has been mentioned that the shape of the portions 61-A, B, C, D (FIGURE 6) will depend upon the configuration of a particular luggage compartment. For this reason I secure the side walls 61, 62 by, e.g., screw means 91 so that, in adapting to another vehicle, if necessary the side walls may be readily removed and replaced by side walls shaped as required. Thus, the unitized structure of my invention provides a range of adaptability so that it is not generally necessary to buy a new camper when buying a new car.

I claim:

1. Unitized accommodation structure for mounting on an automobile, the automobile having a rear bumper, a rear deck, beneath the rear deck, a luggage compartment including a floor and an access lid of the rear deck, a rigid roof, a rear window; the structure in combination with said automobile being characterized by:
   (a) a body unit having spaced apart side walls, a bottom wall, a top wall, and a front wall,
      (i) an end of the body unit remote from the front wall being open, the open end having a width defined by the spaced apart side walls and a height defined by the top and bottom walls,
      (ii) means to secure the body unit to the automobile with the bottom wall thereof spaced from the roof,
   (b) an extension unit having, spaced apart side walls, a bottom wall, a top wall, and front and rear end walls,
      (i) the side walls being spaced apart by a distance greater than the width of the luggage compartment lid,
      (ii) the front wall having an opening,
      (iii) and means to secure the extension unit to the front wall of the body unit with the front wall opening communicating with the body unit through the open end thereof,
      (iv) the bottom wall and rear end wall each having an opening,
   (c) a base unit having spaced apart side walls adapted to be received in the luggage compartment the lid thereof having been removed, and having a rear end wall including an opening, and a bottom wall,
      (i) a lower edge of each side wall having a portion adapted to fit over the rear bumper,
      (ii) each said lower edge having an inwardly extending portion adapted to be supported by the floor of the luggage compartment,
      (iii) the side walls extending upwards so that top edges thereof are above the deck when the base unit is supported as aforesaid,
      (iv) means to secure the extension unit to the base unit with the extension unit bottom opening communicating with the space between the spaced apart base unit side walls, the extension unit bottom wall being clear of the deck,
      (v) the units being secured as aforesaid, the rear walls of the base and extension units being coplanar, and the end wall openings being aligned, to define a door opening,
      (vi) said side walls being removably connected to said rear end wall and bottom wall.

2. Structure as defined in claim 1, having adjustable means of securing the body unit to the adjoining extension unit.

3. Structure as defined in claim 2, the adjustable securing means including a plurality of spaced openings of an end wall, one unit adapted for selective engagement with a dowel of an end wall of an adjoining unit.

4. Structure as defined in claim 2, the body unit bottom wall having a portion adjacent the rear window of the automobile, a window in the said adjacent portion, a door hinged in the door opening, the door having a window portion; the bottom wall window and the door window being adapted so that a driver of the automobile, by means including a rear vision mirror, sees to the rear of the vehicle through the windows aforesaid.

5. Structure as defined in claim 1; the body unit bottom wall having a portion adjacent the rear window of the automobile, a window in the said adjacent portion, a door hinged in the door opening, the door having a window portion; the bottom wall window and the door window being adapted so that a driver of the automobile, by means including a rear vision mirror, sees to the rear of the vehicle through the windows aforesaid.

6. Structure as defined in claim 3; the body unit bottom wall having a portion adjacent the rear window of the automobile, a window in the said adjacent portion, a door hinged in the door opening, the door having a window portion; the bottom wall window and the door window being adapted so that the driver of the automobile, by means including a rear vision mirror, sees to the rear of the vehicle through the windows aforesaid.

7. Structure as defined in claim 1, wherein said means to secure the body unit to the automobile as aforesaid includes: a roof bracket secured to the body unit bottom wall, the roof bracket having an upper surface curved to fit the roof of the automobile, and a lower portion having an extremity adapted to cooperate with a supporting bracket; and means to clamp the supporting bracket to a gutter of the roof.

References Cited
UNITED STATES PATENTS

| | | |
|---|---|---|
| 3,326,594 | 6/1967 | Van Atta. |
| 3,290,084 | 12/1966 | McPherson. |
| 3,145,046 | 8/1964 | Orn. |

PHILIP GOODMAN, *Primary Examiner.*

U.S. Cl. X.R.

52—64